COIN OR TOKEN DISCHARGE MECHANISM FOR MAILABLE RECORD MAGAZINES

Filed Oct. 29, 1948 4 Sheets-Sheet 1

INVENTOR.
Fred Krahulec,
BY Mason, Kolehmainen,
Rathburn & Wyss Attys.

COIN OR TOKEN DISCHARGE MECHANISM FOR MAILABLE RECORD MAGAZINES

Filed Oct. 29, 1948

INVENTOR.
Fred Krahulec,
BY
Mason, Kolehmainen,
Rathburn & Wyss Attys.

April 22, 1952 F. KRAHULEC 2,593,572

COIN OR TOKEN DISCHARGE MECHANISM FOR MAILABLE RECORD MAGAZINES

Filed Oct. 29, 1948

4 Sheets-Sheet 3

INVENTOR.
Fred Krahulec,
BY
Mason, Kolehmainen,
Rathburn & Wyss Atty's.

INVENTOR.
Fred Krahulec,
BY Mason, Kolehmainen, Rathburn & Wyss Attys.

Patented Apr. 22, 1952 2,593,572

UNITED STATES PATENT OFFICE 2,593,572

COIN OR TOKEN DISCHARGE MECHANISM FOR MAILABLE RECORD MAGAZINES

Fred Krahulec, Skokie, Ill., assignor to A. C. Nielsen Company, Chicago, Ill., a corporation of Illinois Application October 29, 1948, Serial No. 57,328

13 Claims. (Cl. 346—25)

The present invention relates to coin release or discharge mechanisms and more particularly to coin release mechanisms associated with recording devices employing a mailable record magazine wherein coins, tokens or the like are released when the record magazine is properly inserted into its position in an associated recorder.

In most recording applications it is necessary periodically to gather up the recorded information for purposes of analysis, correlation or the like. Consequently it has been the practice to have personnel for this purpose periodically to gather up the recorded information by removing from the recorder the portion of the recording element upon which a record has been produced and replacing it with a recording element such as a recording tape or the like upon which subsequent recordings can be made. More recently, to simplify the removal and replacement of recording elements, recorders have been provided in which the recording element is mounted within a suitable magazine or the like so that the simple removal of one magazine and the replacement by another magazine is all that is required. Consequently skilled personnel for this purpose are no longer required since the magazines may be unloaded and reloaded at a point remote from the location of the recording apparatus. In some recording applications the recorders are located at widely scattered points such as in widely scattered homes or the like. It is obvious that a substantial saving could be realized if instead of employing field men or other personnel periodically to remove and replace the magazines from recorders disposed in widely scattered locations persons located near the apparatus could be induced to perform this function and mail the removed magazine to a designated place. One specific recording application to which the present invention is especially applicable is in connection with recording the listening habits of wave signal receiver users. One system and apparatus for this purpose is disclosed and claimed in copending Rahmel application, Serial No. 762,962, filed July 23, 1947, and assigned to the same assignee as the present application. In such a system and apparatus, for determining the listening habits of wave signal receiver users, continuous records are produced on movable tapes, or other suitable recording elements, of the tuning conditions of a representative group of wave signal receivers which are widely scattered over a substantial area of the country. These records must be made available to an analysis organization at periodic intervals such as once a week. Consequently they must be gathered up and delivered to the analysis organization. A substantial cost item is involved in the form of salaries, transportation costs and the like of field men to cover the expense of gathering up the recorded information and transmitting it to the analysis organization. By employing mailable magazines such as are disclosed in the copending Rahmel application a substantial saving in cost could be realized if the collaborator in whose home the recording device is located could be induced to replace the magazines periodically and mail the magazines removed from the recorder which contain the information recorded for the preceding time period to the analysis organization, which in turn would keep the collaborator supplied with reloaded magazines in which the recording element or record tape therein has been replenished. It is, of course, essential to a proper statistical analysis by an analysis organization that the magazines be replaced at predetermined intervals and furthermore that within a predetermined time period preferably within a few days after replacement of the new magazine that the record contained in the replaced magazine is made available to the analysis organization. It would be desirable, therefore, to provide some incentive whereby the collaborator is encouraged to replace the magazine containing the exposed recording element with a replenished magazine and mail the former to the analysis organization. In copending Nielsen application S. N. 57,294, filed October 29, 1948, there is disclosed and broadly claimed an arrangement whereby an incentive is provided to insure the replacement of such magazines in the form of automatically presenting the collaborator with one or more coins or tokens upon proper performance of this simple task allotted to him. The present invention is concerned with an improvement on said Nielsen application.

Accordingly it is an object of the present invention to provide a new and improved recording device employing a mailable recording magazine with means for automatically making available something of value upon insertion of the magazine into the recorder.

It is another object of the present invention to provide an improved coin or token discharge device in a mailable record magazine together with means for automatically discharging one or more coins or tokens in response to the proper association of the magazine with a recorder.

It is a further object of the present invention to provide in connection with a statistical analysis recording apparatus employing mailable magazines for the recording element, improved means for automatically releasing an item of value in response to the proper association of the magazine with the recorder in a manner so that record indications are produced on the recording tape within the magazine.

It is a feature of the present invention to provide in a recorder employing a mailable record magazine a coin discharge device wherein one or more coins or tokens are discharged in response to the insertion of the magazine into its effective position in the recorder, which device is foolproof in operation in the sense that the coins are firmly held in position for mailing purposes as well as against removal thereof by means other than proper insertion of the magazine in the recorder.

A still further object of the present invention is the provision of mechanical release means for causing the release of one or more coins from a magazine upon association with a recording device.

Still another object of the present invention is to provide a coin or token discharge device in connection with a recorder employing a mailable magazine wherein in addition to properly associating the magazine with the recorder an additional function must be performed before release of the coins or tokens occurs.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 3 shows a complete structure, but with the magazine not quite completely inserted into the recording device, or in other words in a position prior to complete insertion of the magazine into the recording device;

Fig. 12 shows a complete structure;

Figures 1, 2, 3, 5:
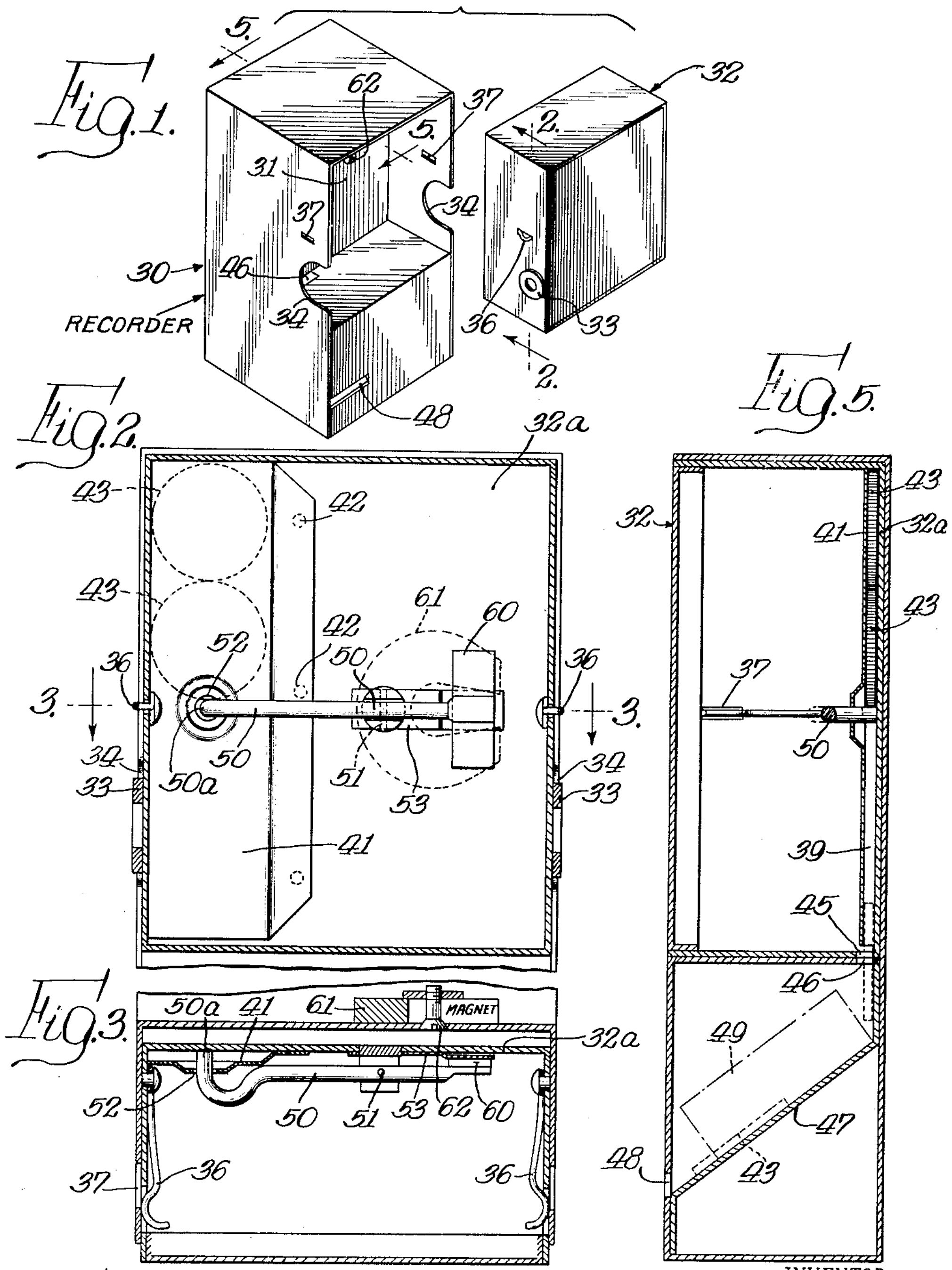
Fig. 1 is a perspective view of a recorder and mailable magazine employing the present invention with the magazine shown removed from the recorder.
Fig. 2 is a sectional view through the magazine and a portion of the recorder taken substantially on line 2—2 of Fig. 1 assuming, however, that the magazine is disposed in its proper position when associated with the recorder.
Fig. 3 is a sectional view taken on line 3—3 of Fig. 2, assuming
Fig. 5 is a sectional view of the recorder taken substantially on line 5—5 of Fig. 1 but with the magazine disposed therein in the manner shown in Fig. 4 of the drawings showing the coins in their properly retained position and also during the process of discharge.

It should be understood that the automatic discharge or release of something of value in response to the proper insertion of a record magazine into an associated recorder could comprise any prize or item of value. In the ensuing description, however, such items of value are specifically disclosed as one or more coins such as quarters or the like and hence the mechanism for releasing the same is broadly referred to as a coin discharge mechanism, since coins are usually relatively small and are readily adapted for storage and release. When the term coin discharge is employed, however, it should be understood to connote a device for discharge of anything of value whether it is a coin or not, the receipt of which thing of value would furnish an incentive for the collaborator in replacing the "exposed" magazine with another.

Referring now to Figs. 1 to 5 of the drawings there is illustrated a recording device generally indicated at 30, the details of which have not been illustrated. Essentially such a recording device would comprise suitable driving means for driving a movable recording element such as a record tape or the like and suitable styli or other indicating means for producing a record on the recording element. Since these details form no part of the present invention they have been completely omitted from the disclosure and the label "recorder" is placed on the device 30 to indicate its function.

The recorder 30 is illustrated as having a recess 31 defined therein for receiving a mailable record magazine generally designated as 32. The mailable record magazine 32 preferably includes a movable recording element therein which is adapted to be driven by suitable driving means when inserted within the recess 31 of the recorder 30. When properly disposed within the recess 31, suitable means such as one or more styli or the like forming either a part of the recorder 30 or solely a part of the magazine 32 are adapted to produce a record on the recording element or tape disposed within the magazine 32. The constructional details of such a recorder and associated mailable record magazine for a particular application are disclosed in the above mentioned copending Rahmel application. It will be understood that the recorder 30 and magazine 32 may comprise similar cooperating elements to those disclosed in the above mentioned Rahmel application. Since the present invention is concerned solely with the coin discharge mechanisms and the means associated therewith responsive to the insertion of the magazine 32 into the recess 31 of the recorder 30, none of the elements of the recorder are shown in the drawings, this being for the purpose of simplifying the disclosure.

For the purpose of permitting ready insertion and removal of the magazine 32 with respect to the recorder 30, the magazine 32 is provided with a pair of annular protrusions 33 which can readily be grasped by the collaborator's fingers while inserting and removing the magazine. To receive the protrusions 33, the portion of the recorder defining the recess 31 is provided with notched out portions 34. With this arrangement the manually graspable portions or annular protrusions 33 are readily available even though the record magazine 32 may be disposed within the recess 31 of the recorder 30.

It will be understood that the magazine 32 should be retained in the recess 31 against inadvertent or accidental removal therefrom. Any suitable means for this purpose may be employed and in some cases the driving means within the recorder which drivingly engages the means for moving the record tape within the record magazine 32 may perform this function. As illustrated in the drawings, however, the magazine is provided with spring like detents 36 on either side thereof which are adapted to engage with cooperating openings 37 defined in the walls of the recess 31. In Fig. 3 of the drawings it may be observed that the detents 36 have not quite been moved into the openings 37 since the magazine is not completely inserted into the recess 31. Upon complete insertion of the magazine the detents releasably retain the magazine 32 within the recess 31. This position of the detents is clearly shown in Figs. 2 and 5 of the drawings.

It will be understood that several means for causing release of any coins retained in the magazine 32 may be employed. For example the coins may be discharged in response to the release of energy stored in a spring. Such an arrangement is disclosed in Figs. 6 to 10 for example. It will also be understood that the coins could be positioned in a manner so that gravity is effective to cause discharge thereof. Such an arrangement is disclosed in the modification shown in Figs. 1 to 5 of the drawings. As illustrated there is defined along one wall, such as for example the rear wall **32*a* of the magazine 32, which may be considered the wall adjacent the bottom of the recess 31, a vertical channel 39 defined by the rear wall 32*a* of the record magazine 32 and a member 41 suitably fastened as indicated at 42 to the rear wall 32*a*. Preferably this channel 39 is of such size as to suitably support in stacked relationship one or more coins designated as 43, in Figs. 2 and 5 of the drawings, which coins may preferably comprise quarter dollars for example. In Figs. 2 and 5 of the drawings two coins 43 are indicated as releasably held near the upper end of the channel 39. The lower end of the channel 39 is preferably open and disposed over aligned openings 45 and 46 defined in the record magazine 32 and the recorder 30 respectively. When released the coins are adapted to fall through the openings 45 and 46 into the lower part of the recorder 30 and onto an inclined slide 47 which guides the coin toward a discharge opening 48 defined near the lower front of the recorder as best shown in Figs. 1 and 5 of the drawings. The slide 47 may be provided with suitable guide portions 49 properly to guide each coin so that it may slide through the opening 48 where it may be received by the collaborator upon insertion of the magazine 32 into the recess 31**.

For the purpose of releasably maintaining the coins 43 within the channel 39 there is provided a supporting member 50 in the form of a rod or wire pivotally supported as indicated at 51 to the rear wall **32*a* within the magazine 32. One end of the pivoted member 50 is provided with a bent portion 50*a* adapted to extend through a suitable opening 52 in the member 41 into the channel 39. When the portion 50*a* of the pivotal member 50 extends into the channel 39 it prevents the movement of a coin through the channel 39 and actually supports or holds the lowermost coin 43 shown in Fig. 5 of the drawings. It will be apparent that withdrawal of the portion 50*a* of the member 50 from within the channel 39 to the position shown in Fig. 4 of the drawings will permit the coins 43 to fall freely through the aligned openings 45 and 46 and along the slide 47 so as to be discharged through the opening 48. Preferably the pivotally mounted member 50 is biased by any suitable means, such for example as the spring 53**, so as to assume its supporting position shown in Figs. 2, 3 and 5 of the drawings.

Figure 4:
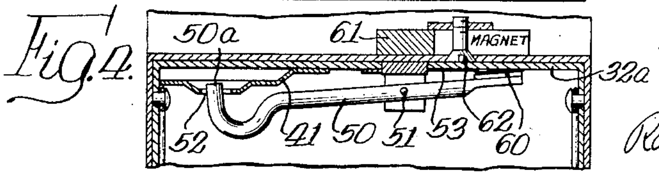
Fig. 4 is a view similar to Fig. 3 with the magazine completely inserted and the coin discharge mechanism actuated to discharge the coins contained therein.

Any suitable means may be provided for moving the pivotal arm 50 from the position shown in Fig. 3 to the position shown in Fig. 4 of the drawings, in response to the insertion of the record magazine 32 into the recess 31. Such actuating means might be mechanical as is disclosed for example in the arrangement shown in Figs. 11 to 15 of the drawings. For the purpose of avoiding the employment of any protruding pin or the like, the supporting member 50, in Figs. 1 to 5 of the drawings, is released from its supporting position by a magnetic means in the following manner. The end of the member 50 remote from the supporting portion **50*a* is provided with an armature portion 60. Preferably the housing of the recorder 30 and the housing of the record magazine 32 are constructed of a non-magnetic material such as a plastic, aluminum or the like. Suitably supported within the recorder 30 and adjacent the rear wall thereof is a magnet specifically illustrated as a horseshoe type magnet 61 which, as illustrated, is clamped to the bottom wall of the recess 31 by a suitable clamping screw 62. The coercive strength of the magnet 61 is such that prior to substantially complete insertion of the magazine 32 within the recess 31 the coercive force is insufficient to attract the armature 60 against the biasing force of the spring 53. As the magazine 32 is moved from the position shown in Fig. 3 of the drawings to the position shown in Fig. 4 of the drawings the coercive force is sufficient to attract the armature 60 with the result that the coins 43 are automatically released in response to insertion of the magazine 32 into the recess 31**.

In view of the detailed description included above the operation of the device shown in Figs. 1 to 5 of the drawings will readily be understood. If, for example, the recorder 30 is used to record information pertinent to a statistical analysis, the analysis organization will when reloading the magazine 32 with a new record tape or other recording element, for example, insert the coins 43 and see that the spring 53 biases the holding portion **50*a* of the member 50 to the position shown in Figs. 3 and 5 of the drawings. If desired a suitable spring may be employed within the channel 39** as is shown for example in some of the other modifications of the present invention described hereinafter to prevent rattling of the coins during mailing thereof. Upon receipt of the magazine the collaborator who is anxious to receive the coins contained therein removes the magazine associated with the recorder 30 and replaces it with the magazine received from the analysis organization, subsequently mailing the replaced magazine to the analysis organization. Since the coin discharge mechanism is, except for the magnet 61 completely disposed within the record magazine 32 it is under the direct control of the analysis organization. It is, of course, necessary to replace the record tape contained therein and consequently little extra effort is involved if at the same time the coins 43 are inserted for subsequent discharge to the collaborator. The construction of the arrangement disclosed in Figs. 1 to 5 is such that discharge of the coin by means other than employing the magnet is substantially impossible and since the collaborator does not know what causes the discharge of the coins, he is not likely to discharge the coins without inserting the magazine in the intended manner.

It will be apparent therefore that there has been provided a simple and inexpensive coin discharge mechanism for mounting within a mailable record magazine which requires a minimum of space, does not substantially increase the weight of the magazine and which is substantially foolproof in operation.

The arrangement described above is admirably suited to insuring prompt mailing or return of the magazine 32 to the analysis organization. As illustrated the coin discharge device is capable of discharging two quarters, for example, in response to insertion of the magazine 32 into the recess 31. If the previous magazine was not returned promptly, the analysis organization might put only a single quarter into the next magazine which will serve as a reminder that prompt return of the magazine will insure the receipt of two quarters instead of one. With this arrangement it is very likely that return of the magazine within a scheduled time will occur. Furthermore, in practically every collaborator's home, whether it be a wealthy home or otherwise, there is usually some person who will eagerly perform the task of changing the magazines for the reward in the form of the coins discharged upon proper insertion thereof. This person might be a child, a servant or anyone else. Consequently the above arrangement insures not only prompt insertion of the cartridge or magazine into the recorder, but furthermore prompt mailing of the removed magazine, both being essential to the best interests of the analysis organization.

With the arrangement described above, the coins which are discharged are loaded into the magazine by the analysis organization each time that the recording element or record tape is replaced. It should be understood that the coins to be discharged might be stored in the recorder itself rather than in the magazine and be automatically released therefrom upon proper insertion of the magazine. This latter arrangement has the disadvantage in that the discharge of one coin instead of two coins when prompt mailing has not occurred during the preceding period can not be accomplished as readily. Furthermore, replacement of the coins in the recorder requires an employee of the analysis organization periodically to visit the recorder. Also any simple means for causing release of the coins stored in the recorder could no doubt be actuated by removing and replacing the same magazine which the collaborator would soon learn, and consequently the coin supply could be exhausted without performance of the required function.

Although in the arrangement described above a magnetic release mechanism was employed to permit the coins or tokens to be discharged under the force of gravity, it will be understood that a spring discharge means which does not rely upon gravity might equally well be employed. In Figs. 6 to 10 of the drawings there is disclosed a recorder mechanism employing the coin or token discharge feature of the present invention wherein a magnetic coin release arrangement is employed but spring means rather than gravity are relied upon to insure discharge of the coins.

Figures 6, 7, 8, 9, 10:
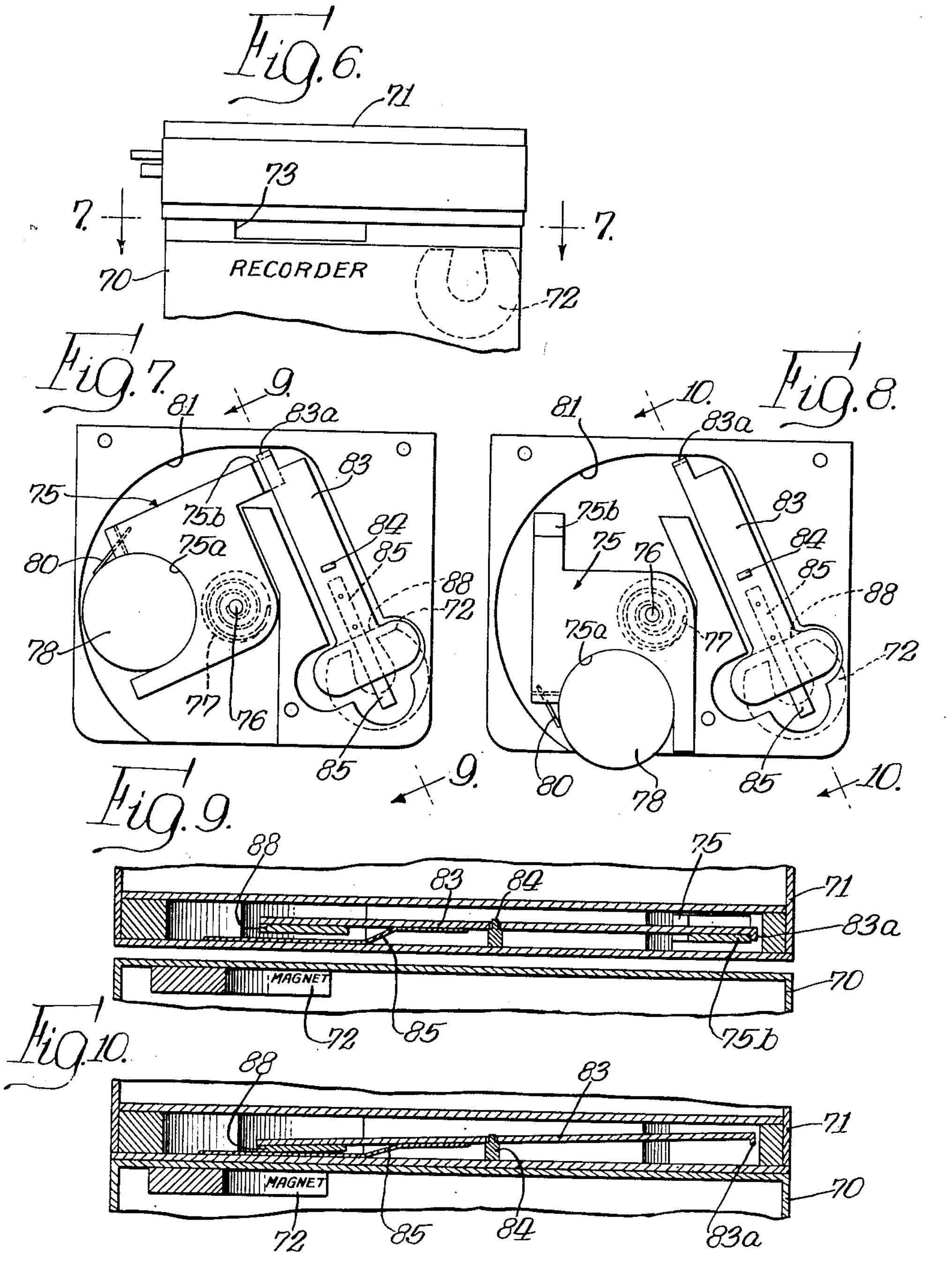
Fig. 6 is a partial view of a recorder and an associated magazine illustrating a modification of the present invention.
Fig. 7 is a view of the magazine taken on line 7—7 of Fig. 6 with the coins in the loaded position prior to discharge and consequently prior to complete association of the magazine with the recorder.
Fig. 8 is a view similar to Fig. 7 showing the coins in the released position.
Fig. 9 is a sectional view taken on line 9—9 of Fig. 7.
Fig. 10 is a sectional view taken on line 10—10 of Fig. 8.

Referring now to Figs. 6 to 10 of the drawings, there is illustrated in Fig. 6 a small portion of the recorder generally designated at 70 with which is associated in any suitable manner a mailable magazine 71. Associated with the recorder 70 adjacent the portion thereof contiguous with the magazine 71 is a permanent magnet 72 (schematically shown in Fig. 6), for magnetically releasing the coins or tokens when the magazine is appropriately associated with the recorder.

As illustrated the magazine 71 is provided with means defining a coin discharge opening 73. Disposed within the portion of the magazine 71 adjacent the recorder 70 and also adjacent the coin discharge opening 73 is a suitable coin carriage mechanism 75 pivotally mounted as indicated at 76. A suitable torsion spring 77 associated with the pivot 76 normally biases the carriage 75 to the discharged or released position shown in Fig. 8 of the drawings where a coin or other token 78 extends partially out of the coin discharge opening 73 so that it may readily be grasped manually by the collaborator's fingers. Preferably the carriage 75 is provided with a curved recess 75a for receiving one or more coins 78. A suitable spring member 80 is provided to grip the edge of the coin so that it may be retained in the coin carriage 75 in a manner firm enough to prevent rattling when the magazine is mailed but not sufficiently firm to prevent the ready removal thereof when grasped by the collaborator. Preferably the portion of the magazine 71 housing the coin discharge mechanism includes a recess 81 for receiving the coin carriage 75 and the coins 78 of sufficient area to permit pivotal movement thereof. This recess is so designed that even if the spring 80 for holding the coin were not provided, the coin would more or less be held in position by the edge of the recess until moved into the discharge opening 73 as shown in Fig. 8 of the drawings.

In order releasably to maintain the coin carriage 75 in the position shown in Fig. 7 of the drawings, there is provided a latch lever 83 mounted for tilting movement upon a suitable support 84 disposed within the magazine 71. A suitable leaf spring 85 fastened to one wall of the magazine and engaging the latch 83 as clearly shown in Fig. 9 of the drawings, normally biases the latch 83 to the latching position shown in Fig. 9 of the drawings. One end of the latch lever 83 is provided with a latch portion 83a adapted to engage an extension 75b of the coin carriage 75. The latching engagement of the latch 83 and the coin carriage device 75 is clearly shown in Figs. 7 and 9 of the drawings.

The other end of the latch member 83 is provided with an armature 88 which is disposed in a manner so as to be closely adjacent to the permanent magnet 72 when the magazine 71 is associated with the recorder 70. Fig. 9 shows the relative positions of the recorder and the magazine parts prior to proper association of the magazine with the recorder, and Fig. 10 shows the parts of the coin discharge mechanism when the magazine is properly associated with the recorder. It is noted that in Fig. 9 the coercive force of the magnet 72 is insufficient to attract the armature 88 and consequently the coin carriage 75 is maintained in a position so that the coins 78 are not accessible. When the magazine 71 has been moved to the position shown in Fig. 10 of the drawings, the armature 88 is within the coercive range of the magnet 72 and the latch member 83 is moved to the indicated position whereupon the coin carriage 75 is pivoted to the position shown in Fig. 8.

It may be noted that with the arrangement disclosed in Figs. 6 to 10 of the drawings the insertion of a tool through the opening 73 to release the coins disposed within the coin carriage 75 will be unsuccessful and if anything will only more firmly latch the mechanism thereby insuring against inadvertent or undesirable removal of the coins from the magazine 71.

It will be apparent that the arrangement disclosed in Figs. 6 to 10 is in many respects similar to the arrangement disclosed in Figs. 1 to 5 except that the mechanism is designed so that a spring 77 moves the coins from the retained to the discharged position as contrasted with employing gravity for this purpose in the earlier described arrangement.

The operation of the arrangement disclosed in Figs. 6 to 10 of the drawings will be obvious to those skilled in the art in view of the detailed description included above.

In the arrangements described heretofore the coin discharge mechanism was actuated merely in response to the association of the magazine with the recorder. In some applications it might be desirable to require the person replacing the magazine to perform an additional chore or duty and in such a case it might be advantageous to have the insertion of the magazine into the recorder merely condition the release of the coins, but to prevent actual release until the further act has been performed.

Figure 11:
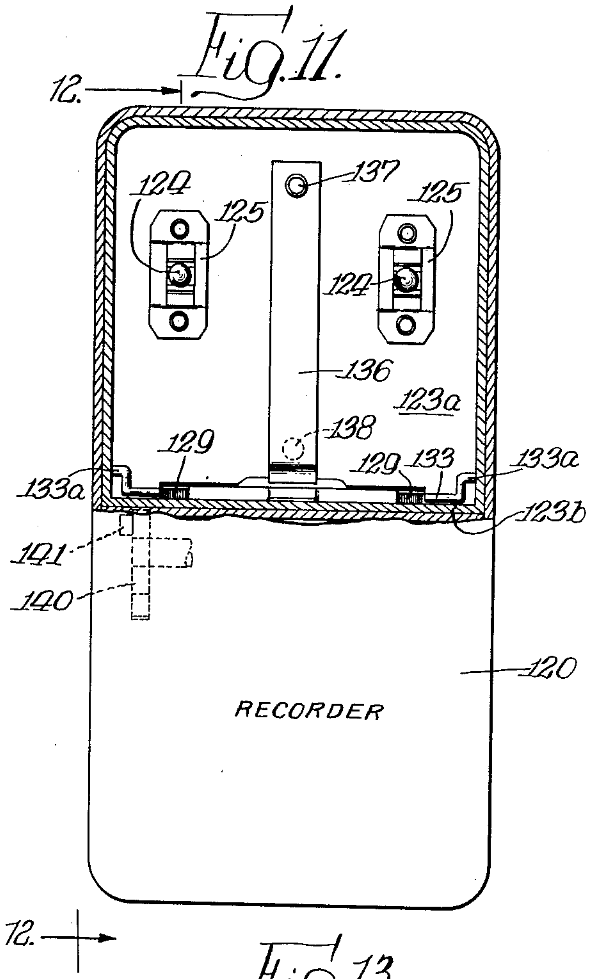
Fig. 11 is a view partly in section of another recording device employing a modification of the present invention.
Figure 12:
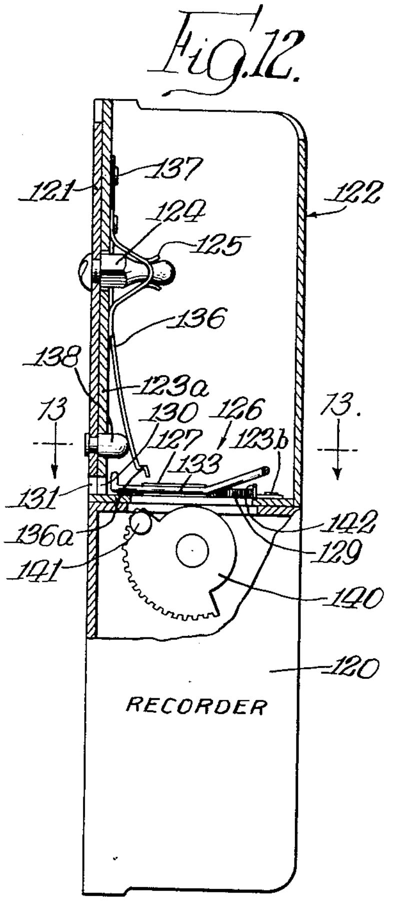
Fig. 12 is a partial sectional view looking in the direction of the arrows 12—12 of Fig. 11.
Figure 13:
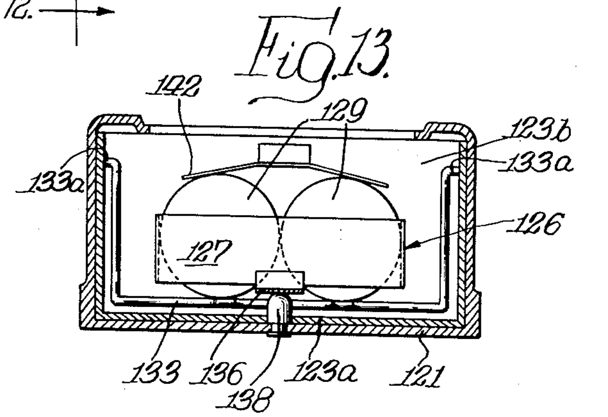
Fig. 13 is a sectional view taken on line 13—13 of Fig. 12, assuming
Figures 14, 15, 16, 17:
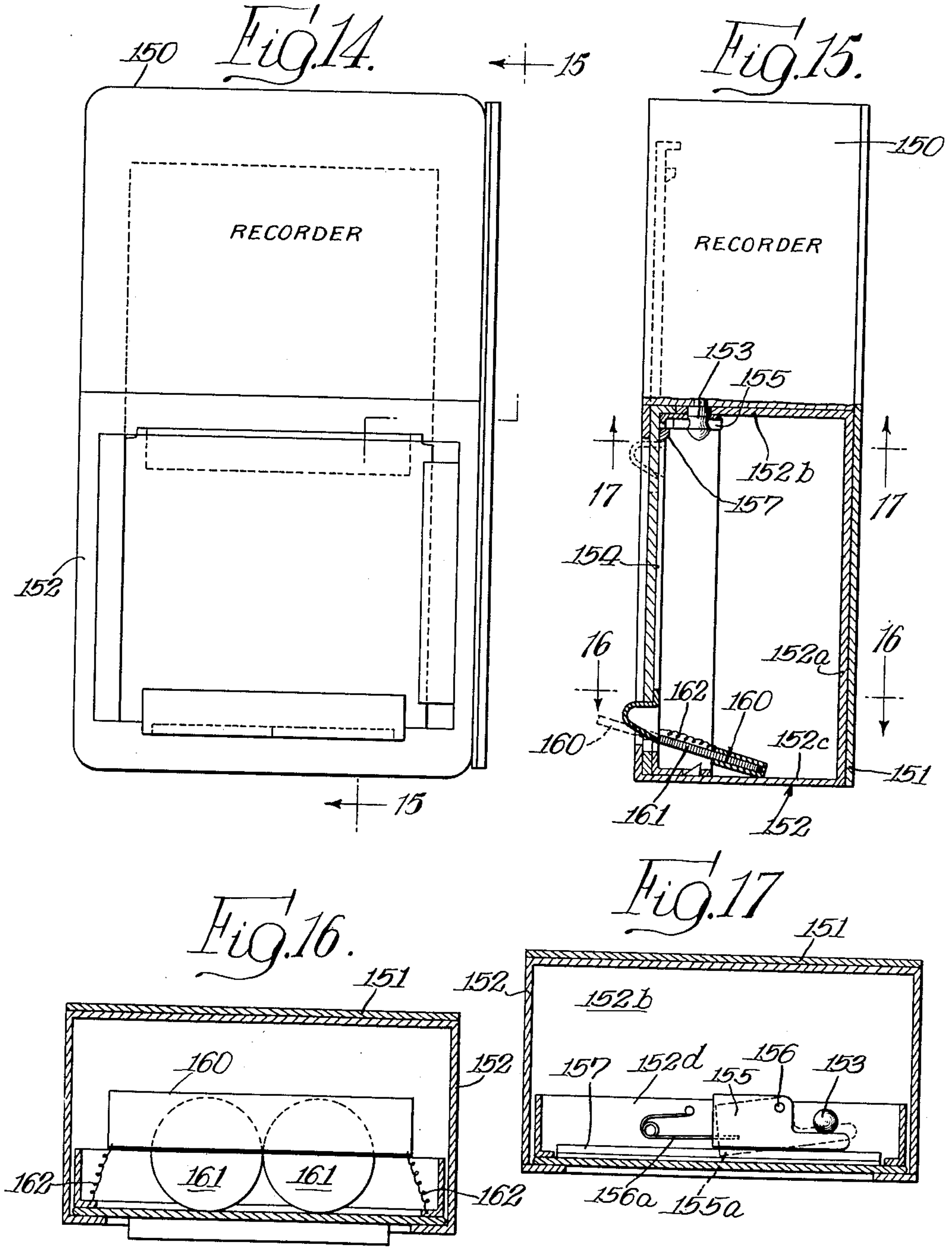
Fig. 14 is a top view of another recording device embodying a modification of the present invention.
Fig. 15 is a partial sectional view taken on line 15—15 of Fig. 14.
Fig. 16 is a sectional view taken on line 16—16 of Fig. 15.
Fig. 17 is a sectional view taken on line 17—17 of Fig. 16.

In Figs. 11 to 13 of the drawings there is disclosed such an arrangement in which there is indicated generally a recorder 120 which includes a base comprising an extension 121 of the base thereof which extension serves as a support or base for a magazine 122. Preferably the magazine includes a bottom wall 123*a* which is adapted to be moved against the base 121 when the magazine is associated with the recorder. For the purpose of holding the magazine in its position against the base 121, the base may be provided with lugs 124 extending through suitable openings in the wall 123*a* into the magazine 122, which lugs are engageable by spring clips 125 suitably fastened to the wall 123*a* by riveting, welding or the like. In order to simplify the disclosure the parts of the recording mechanism have been completely eliminated both from the recorder and the magazine and only the elements essential to the coin discharge mechanism are illustrated.

In accordance with the present invention there is provided a coin chamber 126 which is disposed within the magazine 122 on the wall 123*b* thereof which is adjacent the recorder 120. The coin chamber 126 is defined by the wall 123*b* and a member 127 suitably fastened thereto so as to provide a chamber of proper configuration to receive and hold a pair of coins such as indicated at 129 in Fig. 13 of the drawings. The bottom wall 123*a* of the magazine 122 is provided with an opening or slot 130 which is aligned with a slot 131 in the extension 121. If the coins are not positively retained in the coin chamber 126, they will fall by force of gravity through the aligned openings 130 and 131, when the magazine is in its normal position shown in Fig. 13 of the drawings.

In accordance with the present invention the coins 129 are prevented from sliding out of the coin chamber 126 by means of a retaining wire 133 in the form of a U-shaped wire member whose ends are bent to form trunnions 133*a* which are pivotally mounted in the side walls of the magazine 122. When the wire 133 is moved to the position shown in Figs. 11 and 12 of the drawings it interferes with the movement of the coins out of the coin chamber 126.

To releasably hold the U-shaped wire in the position shown in the drawings a latching spring 136 is provided. One end of the spring 136 is suitably fastened as indicated at 137 to the bottom wall 123*a* of the magazine 122 in such a position that a hook shaped end 136*a* thereof is disposed adjacent to the U-shaped retaining wire 133 and adapted for limited relative movement with respect thereto. Preferably the spring latch 136 has sufficient inherent resilience so as to lie flat against the bottom wall 123*a* whereupon the end 136*a* thereof engages the bottom portion or bight of the retaining wire 133 so as to hold it in an interfering position with respect to the coins 129.

For the purpose of initiating the release of the coins 129 there is provided on the base or extension 121 a pin 138 adapted to extend through a suitable opening defined in the bottom wall 123*a* of the magazine 122 when the magazine is associated with the recorder 120, as illustrated in Figs. 11 to 13 of the drawings. This pin 138 is adapted to engage the spring latch 136 and to move it out of its latching position as is clearly shown in Figs. 12 and 13 of the drawings. When this occurs the retaining wire 133 is free to move out of its retaining position to permit the coins 129 to drop by gravity through the aligned openings 130 and 131.

In accordance with the present invention, however, the association of the magazine 122 with the recorder 120 merely conditions the retaining wire 133 for movement to release the coins and an additional act must be performed to actually move the retaining wire 133 out of its coin retaining position. Such additional act might comprise any one of a myriad of acts of interest to a recording operation and the specific type of act is of no interest as far as the present invention is concerned. The performance of such an act may, for example, actuate a rotatable member 140 suitably mounted for rotation within the recorder 120. As illustrated the rotatable member 140 is provided with a pin 141 which upon rotation of the member 140 is adapted to move through suitable openings defined in the walls between the recorder 120 and the magazine 122 to engage the wire 133 and move it out of its retaining position, whereupon the coins 129 are free to move through the aligned openings 130 and 131. If desired a suitable anti-rattle spring or device 142 may be incorporated in the magazine 122 to prevent the coins within the coin chamber 126 from rattling during mailing thereof.

From the above description it will be apparent that the device disclosed in Fig. 11 to 13 requires an additional act to be performed besides associating the magazine with the recorder before discharge of the coins 129 is obtained. With this arrangement it is apparent that the insertion of a tool to release the latch spring 136 will not discharge the coins and it is unlikely that the collaborator will be able to inadvertently cause release of the coins without performing the two operations required of him.

In Figs. 14 to 17 of the drawings there is illustrated a modification of the arrangement disclosed in Figs. 11 to 13 of the drawings wherein again besides properly associating the magazine with the recorder an additional act must be performed before discharge of the coins is occasioned. As illustrated in Figs. 14 to 17 inclusive there is provided a recorder 150 having an elongated base portion 151 very similar to that provided in the recorder disclosed in Figs. 11 and 13, which elongated base portion 151 is adapted to act as the base for removably supporting a mailable record magazine 152. The magazine 152 is illustrated as having a bottom wall 152*a*, end walls 152*b* and 152*c*, and a slidable top or cover member 152*d*. When the magazine 152 is associated with the recorder a suitable pin 153 supported on the recorder 150 is adapted to be inserted through a cooperating opening in the wall 152*b* of the magazine 152. As illustrated the magazine 152 is associated with the recorder 150 by sliding it along the base or extension 151 until the pin 153 is inserted into the opening therefor defined in the wall 152*b* of the magazine 152.

As illustrated the cover 152*d* of the magazine 152 is normally latched in the closed position by virtue of a pivotally mounted latch 155, pivotally mounted as indicated at 156 to the wall 152*b* of the magazine 152 and disposed within the magazine 152. Normally the pivotally mounted latch 155 is biased by the spring 156*a* to the dotted position shown in Fig. 17 of the drawings. In this dotted position the corner 155*a* of the latching member 155 is moved into a position to engage a flange or latch 157 mounted on the underside of the movable cover 152*d*. Normally, therefore, the latching member 155 when in the dotted line position shown in Fig. 17 holds the cover 152*d* in the closed position. Upon association of the magazine 152 with the recorder 150 the pin 153 is adapted to move the latching member 155 to the solid line position shown in Fig. 17 of the drawings, whereupon it is possible to open the cover 152*d*. From the above description it will be apparent that the additional function or act to be performed in the mechanism disclosed in Figs. 14 to 17 of the drawings is the opening of the cover 152*d* whereupon suitable coins or tokens are made available. To this end there is disposed within the magazine 152 a coin supporting channel 160 adapted to clampingly receive in a releasable manner a pair of coins 161. A suitable spring 162 preferably biases the channel 160 so as to move the coins 160 outside the magazine upon opening of the cover 152*d* to the position shown in dotted lines in Fig. 15 of the drawings. The analysis organization would place the coins within the channel 160 which clamps them sufficiently to prevent their rattling but permits ready removal thereof by the collaborator. Also the cover is closed by the analysis organization, and during the closing operation the latching member 155 engages the latch 157 to lock the cover in the closed position until the magazine is properly inserted in the recorder 150 whereupon the cover 152*d* may be opened and the coins 160 released to the collaborator.

Although there has been illustrated a simple latching arrangement it will be understood that if desired a more complicated latching arrangement comprising several pivotal latching members somewhat in the form of a tumbler lock may be employed to prevent the insertion of a tool or pin of ordinary construction into the magazine to release the latching means rather than to require the association of the magazine with the recorder to obtain such release.

In view of the detailed description included above the operation of the arrangement disclosed in Figs. 14 to 17 will be readily understood by those skilled in the art and no further discussion thereof is included herewith.

From the above description it will be noted that there have been provided numerous embodiments of the present invention for insuring not only the proper association of a mailable record magazine with its recorder but the prompt mailing thereof to an analysis organization. Furthermore in addition to associating the recorder with the magazine an additional step or act may be required to be performed by the collaborator before something of value is made available to him. In this manner the analysis organization for a very low cost has an important step in its operation performed for it thereby greatly reducing the cost of producing the final result by the analysis organization.

While there have been disclosed numerous embodiments incorporating the present invention, it will be understood that many changes and modifications will suggest themselves to those skilled in the art. It is intended in the appended claims to cover all such changes and modifications as fall within the true spirit and scope of the present invention.

What is claimed as new and desired to be secured by Letters Patent of the United States is:

1. In an indicating device, means for receiving and retaining a readily removable and replaceable portion, a readily removable and replaceable portion for disposition in said first mentioned means, coin or token discharge means including a coin retaining chamber forming a part of said device, means for retaining one or more coins or tokens in said chamber, and magnetic means forming a part of said device responsive to the disposition of said readily removable and replaceable portion in said first mentioned means for actuating said last mentioned means whereby a coin or token disposed in said chamber is released.

2. A recording device comprising means defining a magazine receiving space and including a mailable record magazine adapted to be disposed in said space during a recording operation of said device, a pivotally mounted lever in said magazine including at one end means for releasably retaining a coin against the force of gravity, means in said magazine defining a coin discharge opening, an armature fastened to the other end of said lever, and a magnet mounted in said recording device adjacent said space and adapted to attract said armature and release said coin when said magazine is properly positioned in said space, whereby said coin is discharged through said discharge opening.

3. A recording device comprising means defining a magazine receiving space and including a mailable record magazine adapted to be disposed in said space during a recording operation of said device, a movable member mounted for limited movement in said magazine including means for releasably retaining a coin, means in said magazine defining a coin discharge opening, latching means for normally positively holding said coin retaining means so that said coin is inaccessible from said discharge opening, and actuating means on said device adjacent said space for releasing said latching means when said magazine is properly positioned in said space.

4. In combination with a recording device comprising means defining a magazine receiving recess therein and a mailable record magazine adapted to be disposed in said recess during a recording operation of said device, means defining a coin discharge opening in said magazine, pivotally mounted means in said magazine including a chamber for releasably retaining a coin therein, means for biasing said chamber to a position such that said coin is available at said discharge opening, latching means for positively maintaining said chamber in a position in said magazine so that a coin retained therein is inaccessible at said opening, and means responsive to the substantially complete insertion of said magazine into said recess for actuating said latching means.

5. In combination with a recording device comprising means defining a magazine receiving recess therein and a mailable record magazine adapted to be disposed in said recess during a recording operation of said device, means defining a coin discharge opening in said magazine, pivotally mounted means in said magazine including a chamber for releasably retaining a coin therein, spring means for biasing said chamber to a position such that said coin is available at said discharge opening, latching means for maintaining said chamber in a position in said magazine so that a coin retained therein is inaccessible at said opening, and magnetic means disposed in said device responsive to the substantially complete insertion of said magazine into said recess for actuating said latching means.

6. In combination with a recording device comprising means defining a magazine receiving recess therein and a mailable record magazine adapted to be disposed in said recess during a recording operation of said device, means defining a coin discharge opening in said magazine, pivotally mounted means in said magazine including a chamber for releasably retaining a coin therein, spring means for biasing said chamber to a position such that said coin is available at said discharge opening, latching means for maintaining said chamber in a position in said magazine so that a coin retained therein is inaccessible at said opening, an armature associated with said latching means, and a permanent magnet in said device capable of moving said armature only upon substantially complete insertion of said magazine into said recess, whereby said latching means is released.

7. A recording device comprising means defining a magazine receiving space and including a mailable record magazine adapted to be disposed in said space during a recording operation of said device, a movable member mounted for limited movement in said magazine including means for releasably retaining a coin, means in said magazine defining a coin discharge opening, latching means for normally holding said coin retaining means so that said coin is inaccessible from said discharge opening, and actuating means comprising a permanent magnet on said device adjacent said space for releasing said latching means when said magazine is properly positioned in said space.

8. A recording device comprising means defining a magazine receiving recess and including a mailable record magazine adapted to be disposed in said recess during a recording operation of said device, a chamber in said magazine for receiving one or more coins, means for preventing coins disposed in said chamber from rattling during the mailing of said magazine, means for releasably retaining said one or more coins in said chamber, and magnetic actuating means in said device adjacent said recess for actuating said last mentioned means in response to the insertion of said magazine into said recess to cause release of said coins from said magazine.

9. In combination with a recording device comprising means defining a magazine receiving space and a mailable record magazine disposed in said space during a recording operation of said device, coin retaining means in said magazine for releasably retaining a coin, coin release initiating means on said recording device effective when said magazine is properly positioned in said magazine receiving space for conditioning said coin retaining means for the release of said coin, and means responsive to the performance of an additional function for effecting the release of said coin from said magazine.

10. In combination with a recording device comprising means defining a magazine receiving space and a mailable record magazine disposed in said space during a recording operation of said device, a movable cover for said magazine, means in said magazine for releasably retaining a coin and accessible upon opening of said cover, means for latching said cover in the closed position so that said coin is inaccessible, and latch release means on said recording device effective when said magazine is properly positioned in said space for rendering said latching means ineffective, whereupon said coin is available upon opening of said cover.

11. In combination with a recording device comprising means defining a magazine receiving recess and a mailable record magazine disposed in said recess during a recording operation of said device, a cover for said magazine, means in said magazine for supporting a coin, means for moving said coin supporting means to a position rendering said coin readily accessible upon opening of said cover, latching means for normally latching said cover in the closed position with said coin retained therein for mailing purposes, latch release means on said recording device effective when said magazine is operatively positioned in said recess for releasing said latching means, and means responsive to the opening of said cover for rendering said coin accessible.

12. In combination with a recording device comprising means defining a magazine receiving recess therein and a mailable record magazine adapted to be disposed in said recess during a recording operation of said device, means defining a coin discharge opening in said magazine, pivotally mounted means in said magazine for releasably retaining a coin therein, spring means for biasing said pivotally mounted means to a position to cause said coin to be available at said discharge opening, latching means for maintaining said pivotally mounted means in a position in said magazine so that a coin retained thereby is inaccessible at said opening, an armature associated with said latching means, and a permanent magnet in said device capable of moving said armature only upon substantially complete insertion of said magazine into said recess, whereby said latching means is released.

13. A recording device comprising means defining a magazine receiving space and a mailable record magazine capable of being disposed in said space, said recording device including means resulting in a record disposed in said magazine upon completion of the recording operation, means in said magazine for releasably retaining a coin therein, means defining a coin discharge opening at which said coin retained by said last mentioned means is accessible under certain conditions, spring means for urging said means for releasably retaining a coin toward its released position, and coin release actuating means responsive to positioning said magazine in said magazine receiving space for conditioning said means for releasably retaining a coin to release a coin retained thereby.

FRED KRAHULEC.

REFERENCES CITED

The following references are of record in the file of this patent:

UNITED STATES PATENTS

| Number | Name | Date |
|---|---|---|
| 1,901,528 | Olsen | Mar. 14, 1933 |
| 2,430,384 | Broussard | Nov. 4, 1947 |